United States Patent
Sip

(10) Patent No.: US 8,222,755 B2
(45) Date of Patent: Jul. 17, 2012

(54) ENERGY RECYCLING STRUCTURE

(75) Inventor: Kim-Yeung Sip, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 479 days.

(21) Appl. No.: 12/494,329

(22) Filed: Jun. 30, 2009

(65) Prior Publication Data

US 2010/0237628 A1     Sep. 23, 2010

(30) Foreign Application Priority Data

Mar. 19, 2009   (CN) .......................... 2009 1 0300964

(51) Int. Cl.
*F02B 63/04*     (2006.01)
*F03G 7/08*      (2006.01)
*H02K 7/18*      (2006.01)
*F02D 29/06*     (2006.01)
*H02P 9/04*      (2006.01)

(52) U.S. Cl. .............. 290/1 R; 290/40 C; 318/9; 318/50

(58) Field of Classification Search .................. 290/1 R, 290/40 C; 318/9, 10, 50
See application file for complete search history.

(56) References Cited

U.S. PATENT DOCUMENTS

| | | | | |
|---|---|---|---|---|
| 2,644,905 A * | 7/1953 | Brueder | ........................ | 310/78 |
| 3,441,822 A * | 4/1969 | Shibata | ........................ | 318/735 |
| 3,644,766 A * | 2/1972 | Hughes | ........................ | 310/165 |
| 3,683,249 A * | 8/1972 | Shibata | ........................ | 318/730 |
| 3,754,174 A * | 8/1973 | Shibata | ........................ | 318/9 |
| 3,789,281 A * | 1/1974 | Shibata | ........................ | 318/696 |
| 4,309,620 A * | 1/1982 | Bock | ........................ | 290/4 R |
| 4,373,147 A * | 2/1983 | Carlson, Jr. | ........................ | 318/48 |
| 4,375,047 A * | 2/1983 | Nelson et al. | ........................ | 318/48 |
| 5,644,200 A * | 7/1997 | Yang | ........................ | 318/139 |
| 5,789,877 A * | 8/1998 | Yamada et al. | ........................ | 318/9 |
| 5,791,426 A * | 8/1998 | Yamada et al. | ........................ | 180/65.24 |
| 5,804,934 A * | 9/1998 | Yamada et al. | ........................ | 318/77 |
| 5,873,801 A * | 2/1999 | Taga et al. | ........................ | 477/5 |
| 5,903,112 A * | 5/1999 | Yamada et al. | ........................ | 318/10 |
| 5,903,113 A * | 5/1999 | Yamada et al. | ........................ | 318/10 |
| 5,905,346 A * | 5/1999 | Yamada et al. | ........................ | 318/50 |
| 5,909,094 A * | 6/1999 | Yamada et al. | ........................ | 318/140 |
| 5,920,160 A * | 7/1999 | Yamada et al. | ........................ | 318/9 |
| 5,942,862 A * | 8/1999 | Yamada et al. | ........................ | 318/9 |
| 5,973,460 A * | 10/1999 | Taga et al. | ........................ | 318/139 |
| 5,988,307 A * | 11/1999 | Yamada et al. | ........................ | 180/243 |
| 5,998,901 A * | 12/1999 | Kawabata et al. | ........................ | 310/114 |
| 6,087,734 A * | 7/2000 | Maeda et al. | ........................ | 290/40 C |
| 6,380,653 B1 * | 4/2002 | Seguchi | ........................ | 310/112 |
| 6,462,430 B1 * | 10/2002 | Joong et al. | ........................ | 290/40 C |
| 6,577,022 B2 * | 6/2003 | Joong et al. | ........................ | 290/40 C |
| 6,793,059 B2 * | 9/2004 | Okada et al. | ........................ | 192/84.1 |
| 6,833,646 B2 * | 12/2004 | Joong et al. | ........................ | 310/114 |

(Continued)

*Primary Examiner* — Pedro J Cuevas
(74) *Attorney, Agent, or Firm* — Altis Law Group, Inc.

(57) ABSTRACT

An energy recycling structure includes a primary portion, a secondary portion and a positioning shaft. The primary portion connects to a motor and includes a radially magnetic assembly including a number of strips having different magnetic strength. The secondary portion connects to a driven element and includes a coil electrically connecting to a peripheral device. The positioning shaft connects the primary portion and the secondary portion. A current flows in the coil when the coil cuts the magnetic lines of force of the magnetic assembly during rotation of the magnetic assembly.

13 Claims, 4 Drawing Sheets

U.S. PATENT DOCUMENTS

| | | | |
|---|---|---|---|
| RE38,790 E * | 9/2005 | Maeda et al. | 290/40 C |
| 2002/0100624 A1* | 8/2002 | Joong et al. | 180/65.4 |
| 2003/0102674 A1* | 6/2003 | Joong et al. | 290/40 C |
| 2003/0173124 A1* | 9/2003 | Okada et al. | 180/65.2 |
| 2004/0189128 A1* | 9/2004 | Joong et al. | 310/152 |
| 2012/0038166 A1* | 2/2012 | Tsumagari | 290/55 |

* cited by examiner

ENERGY RECYCLING STRUCTURE

BACKGROUND

1. Technical Field

The present disclosure relates to an energy recycling, and more particularly, to an energy recycling structure.

2. Description of Related Art

When a car is stopped at a traffic light or stuck in traffic, the engine of the car is idled. Most of the mechanical energy of the idling engine is converted to heat or thermal energy and dispersed into air. This is a waste of energy.

Therefore, it is desirable to provide an energy recycling structure, which can overcome or at least alleviate the above-mentioned problem.

BRIEF DESCRIPTION OF THE DRAWINGS

Many aspects of the present energy recycling structure should be better understood with reference to the following drawings. The components in the drawings are not necessarily drawn to scale, the emphasis instead being placed upon clearly illustrating the principles of the present energy recycling structure. Moreover, in the drawings, like reference numerals designate corresponding parts throughout the several views.

DETAILED DESCRIPTION

Embodiments of the present energy recycling structure will be now described in detail with reference to the drawings.

Figure 1:
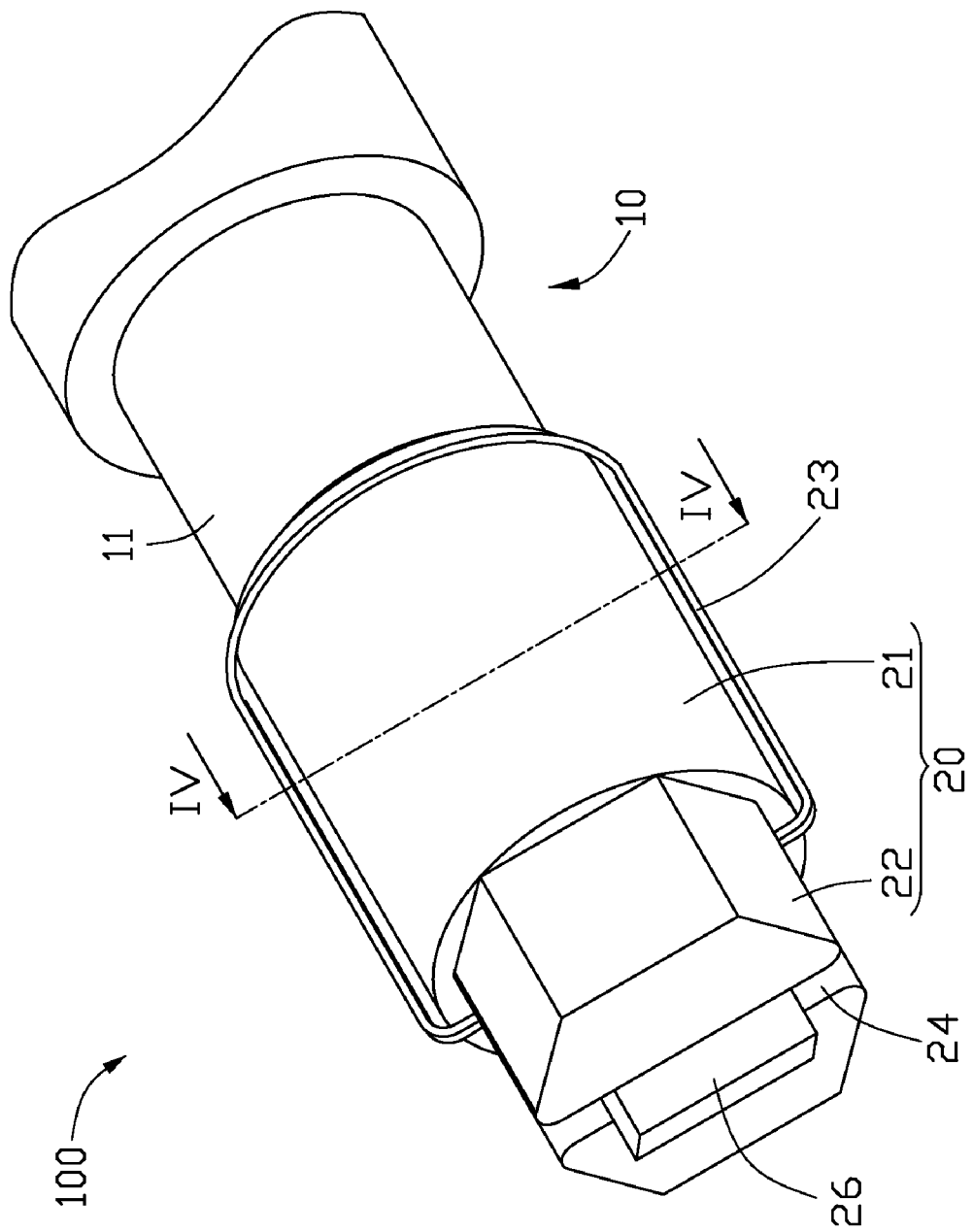
FIG. 1 is an isometric, assembly view of an energy recycling structure, according to an exemplary embodiment.
Figure 2:
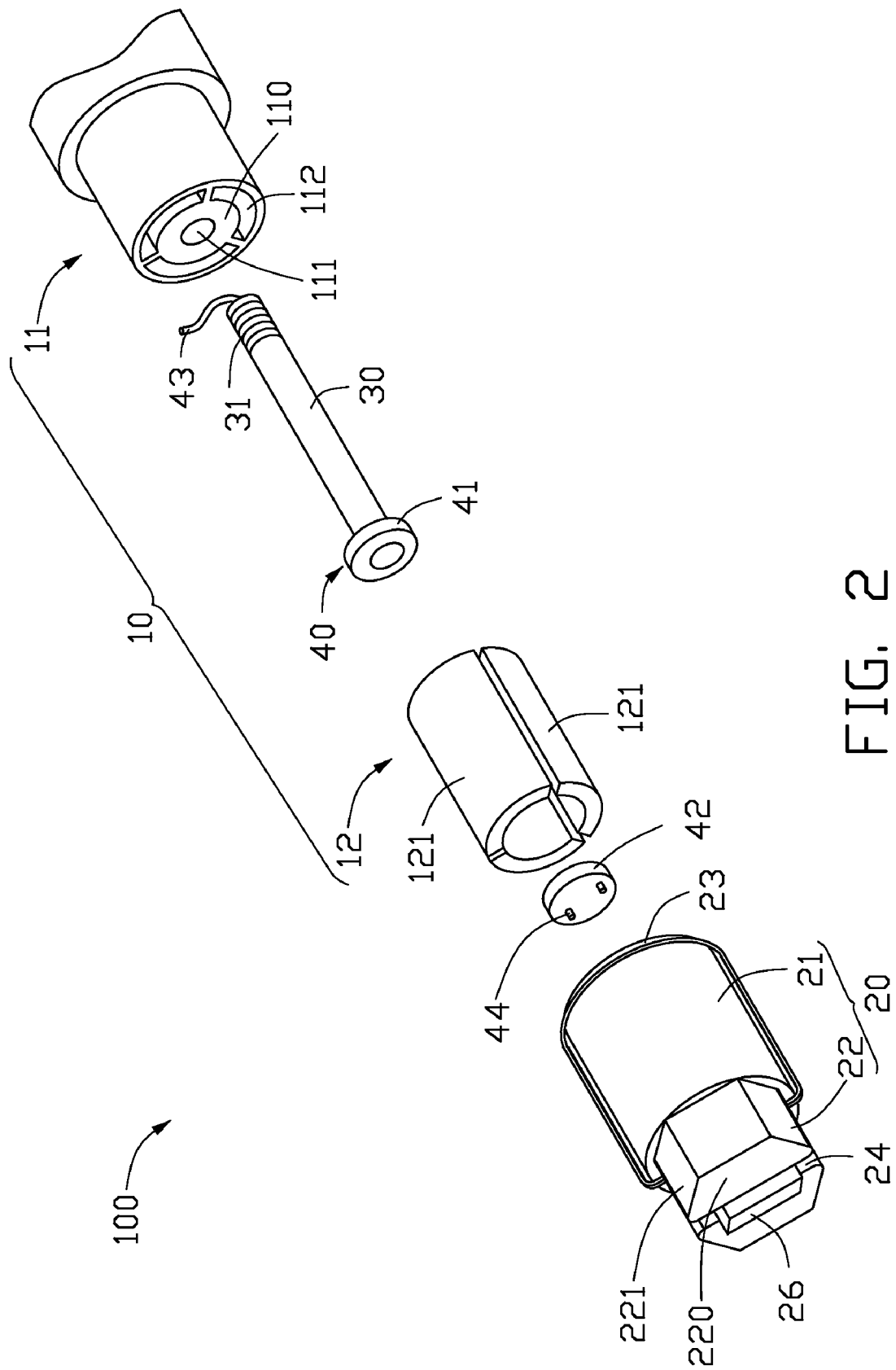
FIG. 2 is an isometric, exploded view of the energy recycling structure of FIG. 1.

Referring to FIGS. 1-2, an energy recycling structure 100 includes a primary portion 10, a secondary portion 20 and a positioning shaft 30 connecting the primary portion 10 with the secondary portion 20. A clutch 40 is mounted on the positioning shaft 30 for controlling the primary portion 10 to engage or disengage with the secondary portion 20. In this embodiment, the clutch 40 is an electromagnetic clutch.

The primary portion 10 is connected to a motor (not shown). The secondary portion 20 is fixed to a driven element, e.g. a wheel (not shown). The primary portion 10 can drive the secondary portion 20 to rotate when the clutch 40 is in an engaged state.

The primary portion 10 includes a connecting member 11 for connecting to the motor, and a magnetic assembly 12 fixed to the connecting member 11. The magnetic assembly 12 is cylindrically shaped.

An end surface 110 of the connecting member 11, facing the secondary portion 20, defines a screw hole 111 in the center and a number of receiving grooves 112 around the screw hole 111.

The magnetic assembly 12 includes a number of magnetic strips 121 with different magnetic strength. One end of each magnetic strip 121 is received in the corresponding receiving groove 112, thereby a part of each magnetic strip 121 protrudes out of the receiving grooves 112. In this embodiment, the number of the magnetic strips 121 is three. Each of the magnetic strips 121 is confirmed radially and not axially magnetized, so that the magnetic lines of force of the magnetic strip 121 is radially transmitting from the outer surface thereof.

The secondary portion 20 includes a barrel end 21 close to the primary portion 10 and an axle end 22 away from the primary portion 10. A coil 23 is wrapped on the outer surface of the barrel end 21.

Figure 3:
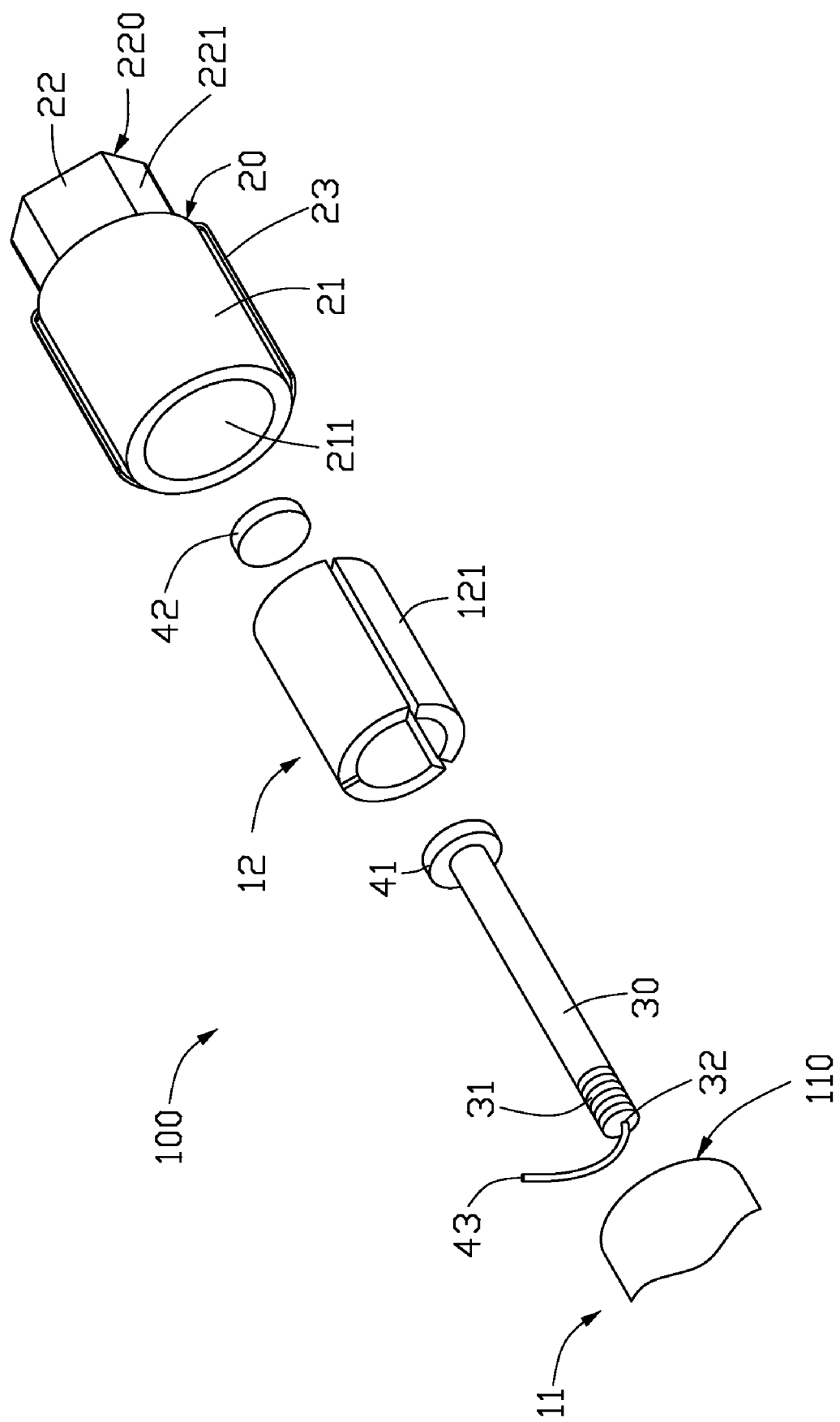
FIG. 3 is similar to FIG. 2, but showing another view of the energy recycling structure of FIG. 1.

The barrel end 21 defines a receiving cavity 211 (shown in FIG. 3). The part of the magnetic assembly 12 protruding out of the receiving grooves 112 is received in the receiving cavity 211. The magnetic assembly 12 is arranged coaxially with the barrel end 21. The outer diameter of the magnetic assembly 12 is smaller than the inner diameter of the barrel end 21. Therefore, when the magnetic assembly 12 is rotated relative to the barrel end 21, the magnetic assembly 12 is not touching the barrel end 21, so no friction between the magnetic assembly 12 and the barrel end 21 exists. The barrel end 21 is made of magnetic conductive material.

The axle end 22 is cylindrically shaped and defines an end surface 220, away from the barrel end 21, and a side wall 221. The end surface 220 defines a groove 24 extending along the side wall 221 and a through hole 25 (shown in FIG. 4) in the center of the end surface 220. The axle end 22 can be integrally formed with the barrel end 21.

The coil 23 is wrapped around the outer surface of the barrel end 21. In this embodiment, part of the coil 23 extends from the groove 24 along an axial direction of the barrel end 21 and is then wrapped around the barrel end 21. After wrapping a half circle of the barrel end 21, the coil 23 is inserted into the groove 24 along another axial direction of the barrel end 21 again. This process is repeated until the required number of turns of the coil 23 is achieved. In this embodiment the number of turns may be two. The coil 23 can be adhered to the outer surface of the barrel end 21 by glue. Two ends of the coil 23 are connected to an end of a peripheral device 26 correspondingly to provide power to the peripheral device 26. The peripheral device 26 can be a light emitting diode (LED) or a rechargeable battery. In this embodiment, the peripheral device 26 is a rechargeable battery for collecting electrical energy generated by the coil 23. The peripheral device 26 can be received in the groove 24. Thus, the whole volume of the energy recycling structure 100 can be reduced.

Figure 4:
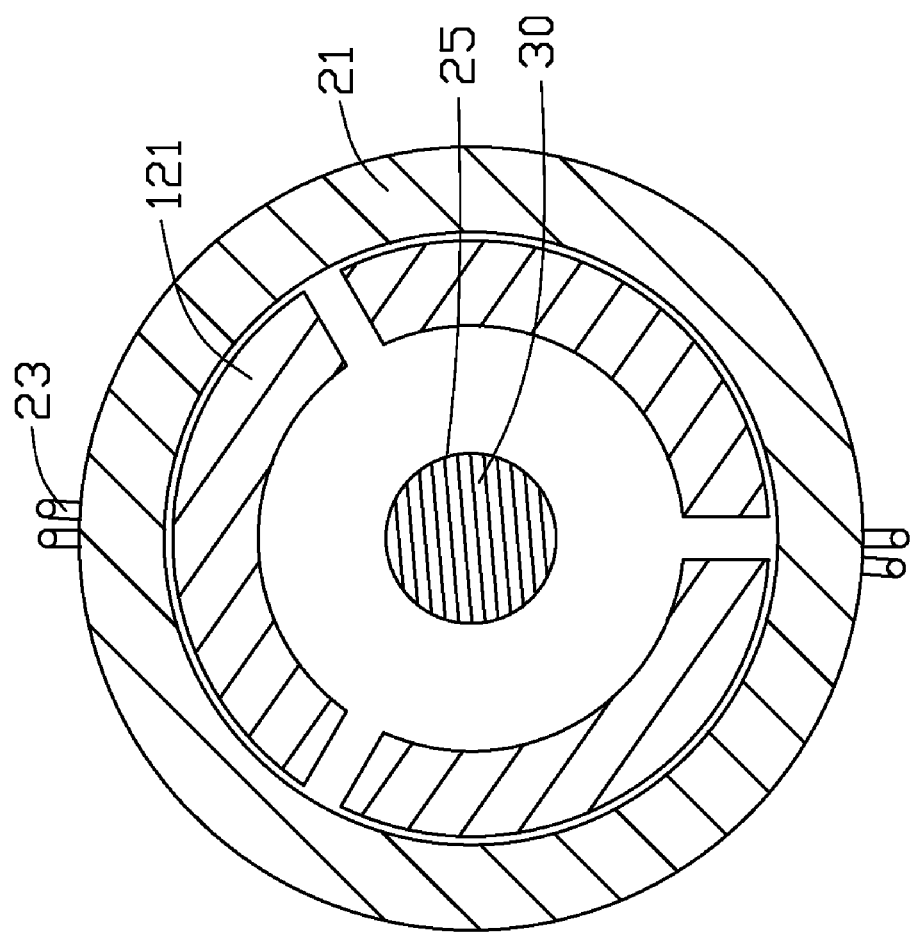
FIG. 4 is a cross-sectional view of the energy recycling structure taken along line IV-IV of FIG. 1.

Further referring to FIGS. 3-4, a first end of the positioning shaft 30 is engaged with the clutch 40. The positioning shaft 30 includes a threaded segment 31 engageable with the screw hole 111 of the connecting member 11 on another side of the positioning shaft 30 opposite to the first end. The positioning shaft 30 further defines a through groove 32 along the center axis thereof.

The clutch 40 includes an electromagnetic coil 41 and a magnet 42 facing the electromagnetic coil 41. The electromagnetic coil 41 is sleeved on the first end of the positioning shaft 30 and electrically connected to a power supply (not shown) via a lead 43 extending through the through groove 32. The magnet 42 is fixed on the axle end 22 by bolts 44 and received in the barrel end 21. When the electromagnetic coil 41 is provided with power, the magnet 42 is attracted by the electromagnetic force of the electromagnetic coil 41, thus the clutch 40 can be in the engaged state. When the coil 41 has no power, the magnet 42 is separated with the coil 41 thus the clutch 40 is in a disengaged state.

When the primary portion 10 rotates and the clutch 40 is in the disengaged state, the positioning shaft 30 and the magnetic assembly 12 can be rotated relative to the coil 23.

When the magnetic assembly 12 is rotated relative to the coil 23, the coil 23 cuts the magnetic lines of force of the magnetic assembly 12. Because the magnetization intensity relative to the coil 23 changes when the magnetic assembly 12 rotates, the magnetic flux of the coil 23 changes too, thereby producing an inductive current in the coil 23 and the peripheral device 26. The induced current can be provided to the peripheral device 26. That is, when the primary portion 10 rotates relative to the secondary portion 20, the mechanical energy of the rotating primary portion 10 can be converted into electrical energy and this electrical energy can be used to power or recharge the peripheral device 26 as the case may be.

It will be understood that the above particular embodiments and methods are shown and described by way of illustration only. The principles and the features of the present invention may be employed in various and numerous embodiments thereof without departing from the scope of the invention as claimed. The above-described embodiments illustrate the scope of the invention but do not restrict the scope of the invention.

What is claimed is:

1. An energy recycling structure comprising:
    a primary portion capable of connecting to a motor, the primary portion comprising a connecting member and a radially magnetic assembly, the connecting member configured to connect the primary portion to the motor, the magnetic assembly being fixed to the connecting member and comprising a plurality of strips having different magnetic strength;
    a secondary portion capable of connecting to a driven element, the secondary portion comprising a coil electrically connected to a peripheral device;
    a positioning shaft connected to the primary portion and the secondary portion; and
    an electromagnetic clutch mounted on the positioning shaft, the electromagnetic clutch comprising an electromagnetic coil and a magnetic facing the electromagnetic coil;
    wherein the electromagnetic coil is sleeved on the positioning shaft and connected to a power supply; and
    wherein a current flows in the coil when the coil cuts the magnetic lines of force of the magnetic assembly during rotation of the magnetic assembly.

2. The energy recycling structure in claim 1, wherein an end of the connecting member defines a screw hole and a plurality of receiving grooves around the screw hole, a part of each magnetic strip received in the receiving grooves.

3. The energy recycling structure in claim 2, wherein the positioning shaft comprises a threaded segment screwed into the screw hole of the connecting member.

4. The energy recycling structure in claim 1, wherein the magnetic assembly is cylindrically shaped.

5. The energy recycling structure in claim 1, wherein the secondary portion comprises a barrel end close to the primary portion and an axle end away from the primary portion, and the coil is wrapped on the outer surface of the barrel end.

6. The energy recycling structure in claim 5, wherein the outer diameter of the magnetic assembly is smaller than the inner diameter of the barrel end.

7. The energy recycling structure in claim 5, wherein the barrel end defines a receiving cavity thereon for receiving the magnetic assembly therein, the magnetic assembly coaxially arranged with the barrel end.

8. The energy recycling structure in claim 5, wherein the barrel end is made of magnetic conductive material.

9. The energy recycling structure in claim 5, wherein the axle end defines an end surface away from the barrel end and a side wall thereof, the end surface defining a groove extending along the side wall and a through hole in the center of the end surface.

10. The energy recycling structure in claim 9, wherein the coil extends from the groove along an axial direction of the barrel end and is then wrapped around the barrel end, and after wrapping a half circle of the barrel end, the coil is inserted into the groove along another axial direction of the barrel end again.

11. The energy recycling structure in claim 9, wherein two ends of the coil are connected to an end of the peripheral device correspondingly to provide power to the peripheral device.

12. The energy recycling structure in claim 5, wherein the coil is adhered to the outer side surface of the barrel end by glue.

13. The energy recycling structure in claim 1, wherein the positioning shaft defines a through groove therethrough, a lead extending through the through groove and connecting the power supply and the electromagnetic coil.

* * * * *